(12) United States Patent
James et al.

(10) Patent No.: US 8,312,244 B1
(45) Date of Patent: *Nov. 13, 2012

(54) SYSTEM AND METHOD FOR MANAGING A DATA STORAGE SYSTEM BY CONTACTING A SINGLE PROCESSOR IN A DATA STORAGE SYSTEM HAVING MORE THAN ONE PROCESSOR

(75) Inventors: Britton James, Watertown, MA (US); Kevin S. Labonte, North Grafton, MA (US); Russell R. Laporte, Webster, MA (US); Paul Lapomardo, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,251

(22) Filed: Apr. 5, 2011

Related U.S. Application Data

(63) Continuation of application No. 11/093,632, filed on Mar. 30, 2005, now Pat. No. 7,945,756.

(51) Int. Cl.
*G06F 12/00* (2006.01)
*G06F 13/00* (2006.01)

(52) U.S. Cl. ............... 711/170; 711/148; 711/E12.001; 709/223

(58) Field of Classification Search .................. None
See application file for complete search history.

(56) References Cited

U.S. PATENT DOCUMENTS

| | | | | | |
|---|---|---|---|---|---|
| 4,633,387 | A | * | 12/1986 | Hartung et al. | 711/E12.019 |
| 5,148,540 | A | * | 9/1992 | Beardsley et al. | 714/5.11 |
| 6,038,644 | A | * | 3/2000 | Irie et al. | 711/141 |
| 6,484,220 | B1 | * | 11/2002 | Alvarez et al. | 711/147 |
| 6,839,750 | B1 | * | 1/2005 | Bauer et al. | 709/223 |
| 7,124,179 | B1 | * | 10/2006 | Bauer et al. | 709/223 |
| 7,181,578 | B1 | * | 2/2007 | Guha et al. | 711/154 |

* cited by examiner

*Primary Examiner* — Michael Krofcheck
(74) *Attorney, Agent, or Firm* — Krishnendu Gupta; Joseph D'Angelo

(57) ABSTRACT

An architecture, system, and method for managing a data storage system by contacting a single processor in a data storage system having more than one processor. The single processor contacts each other peer processor in the data storage system and merges selected data from the single processor with data from the peer processor to determine the state of the data storage system.

26 Claims, 10 Drawing Sheets

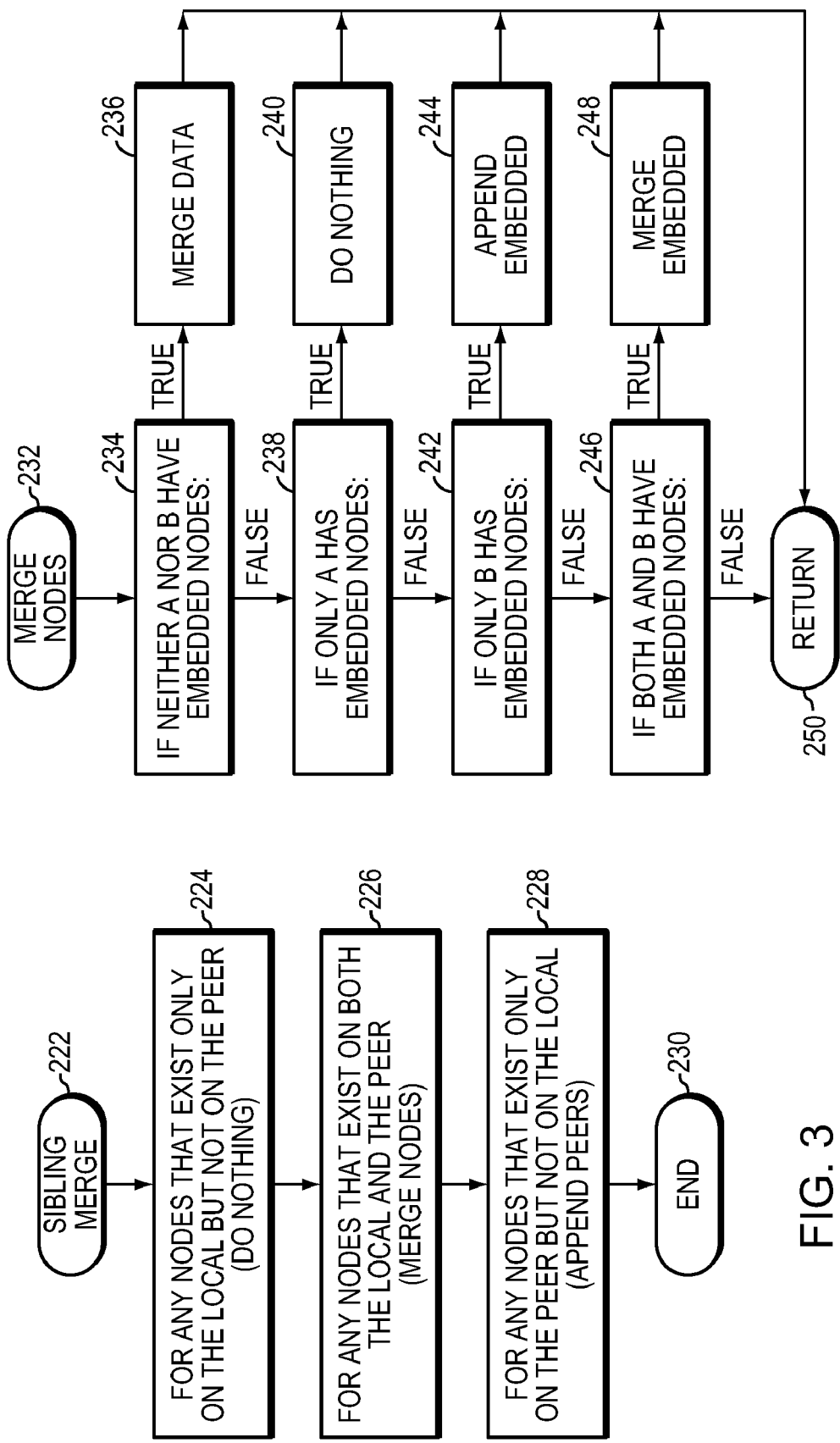

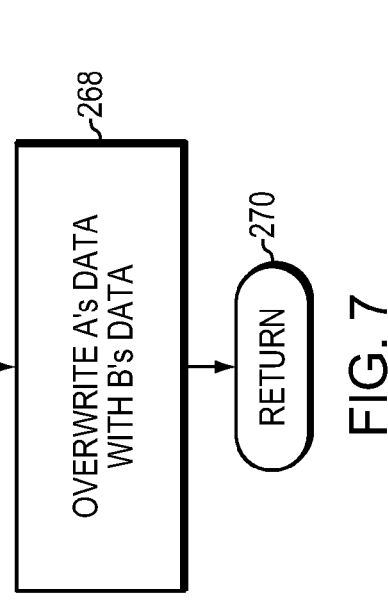
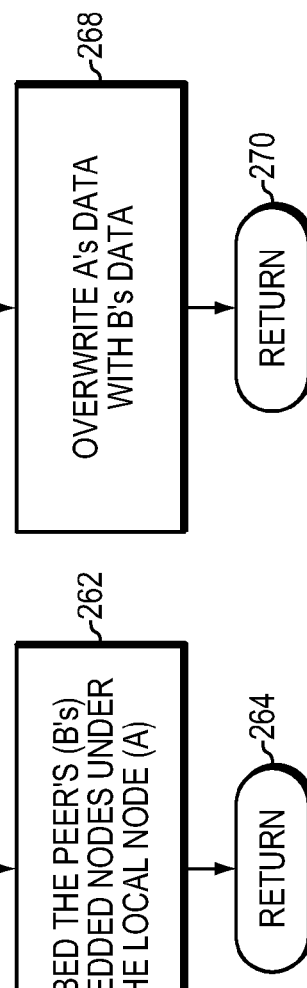
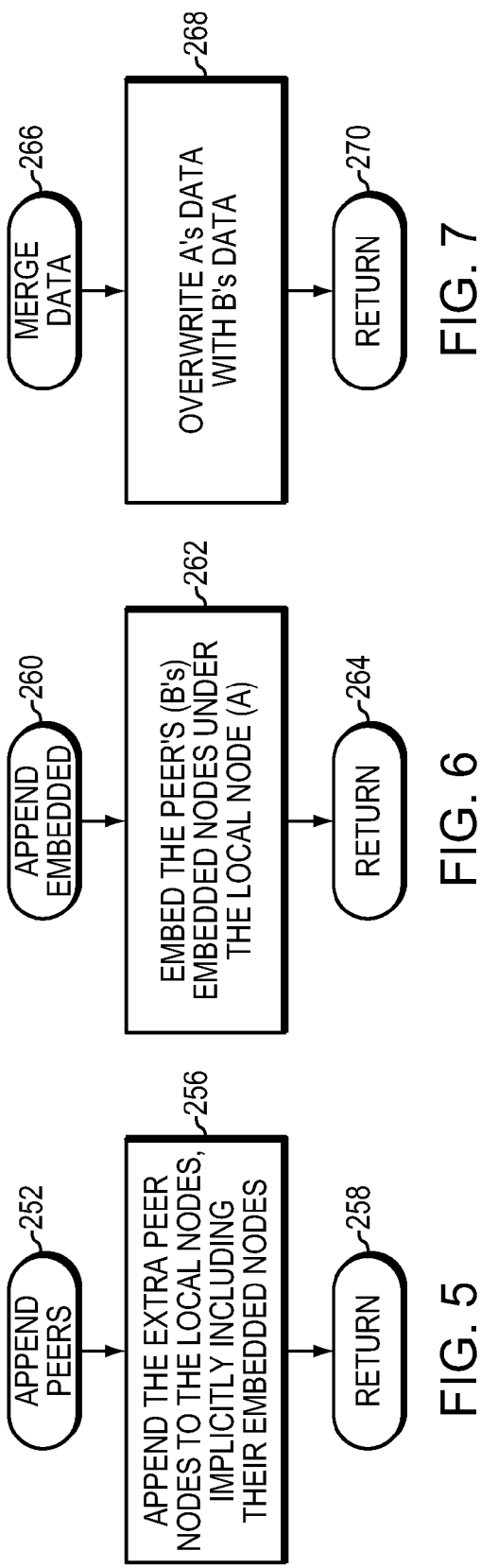
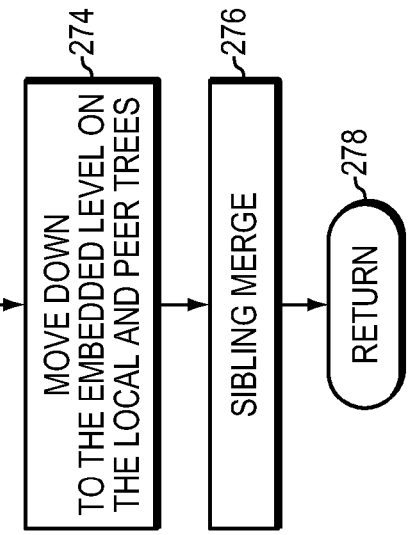

SYSTEM AND METHOD FOR MANAGING A DATA STORAGE SYSTEM BY CONTACTING A SINGLE PROCESSOR IN A DATA STORAGE SYSTEM HAVING MORE THAN ONE PROCESSOR

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to data storage management, and more specifically to a system and method for managing a data storage system from a single location

RELATED CASES

This application is related to co-pending U.S. patent application Ser. Nos. 11/094,112 entitled "Architecture And Apparatus For Managing A Data Storage System By Contacting A Single Processor In A Data Storage System Having More Than One Processor" by Britton, et al filed on even date with this application, and is assigned to EMC Corporation, the same assignee as this invention.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a Local computer system, may include a large number of independent storage devices or disks housed in a single enclosure or cabinet. This array of storage devices is typically connected to several computers over a network or via dedicated cabling. Such a model allows for the centralization of data that is to be shared among many users and also allows for a single point of maintenance for the storage functions associated with the many host processors.

The data storage system stores critical information for an enterprise that must be available for use substantially all of the time. Some data storage systems have more than one processor. This provides advantages in terms of speed of processing and failure back up for a failed processor. However, since each processor has management responsibility for various aspects of the storage array each acts relatively independently and must be accessed individually for management of the array. There is also a limit for failure backup since each processor may manage its own individual components, the other processor or processors may not be aware of any changes that have occurred since it last polled the device. There is a need to provide for a single point of management while not giving up any of the advantages of faster processing and improving fault tolerance.

SUMMARY OF THE INVENTION

To overcome the problems and provide the advantages that have been described above, the present invention in one embodiment is a system and method that provides for a single location of management for a data storage system having a plurality of processors.

The method is useful in a data storage system having a plurality of processors each managing an object database associated with each processor. This method comprises contacting a single processor of the plurality of processors with a request for the single processor to determine a state of the data storage system, and in response to the contacting step, the single processor contacting each other peer processor in the data storage system and merging selected data from the single processor with data from the peer processor to determine the state of the data storage system.

In another embodiment the method is performed by a computer-program product including a computer-readable medium encoded with program logic for performing method steps similar or identical to those described above.

In still another embodiment an apparatus is provided that is configured for performing steps described with reference to the method embodiment.

In still another embodiment an architecture is provided including program logic for performing method steps similar or identical to those described above.

BRIEF DESCRIPTION OF THE DRAWINGS

The above and further advantages of the present invention may be better under stood by referring to the following description taken into conjunction with the accompanying drawings in which:

FIG. 3 is a flow logic diagram showing certain aspects involved in carrying out the methodology of FIG. 2;

FIG. 4 is another flow logic diagram showing certain aspects involved in carrying out the methodology of FIG. 2;

FIG. 5 is another flow logic diagram showing certain aspects involved in carrying out the methodology of FIG. 2;

FIG. 6 is another flow logic diagram showing certain aspects involved in carrying out the methodology of FIG. 2;

FIG. 7 is another flow logic diagram showing certain aspects involved in carrying out the methodology of FIG. 2;

FIG. 8 is another flow logic diagram showing certain aspects involved in carrying out the methodology of FIG. 2;

DETAILED DESCRIPTION OF THE PREFERRED EMBODIMENT

Figure 1:
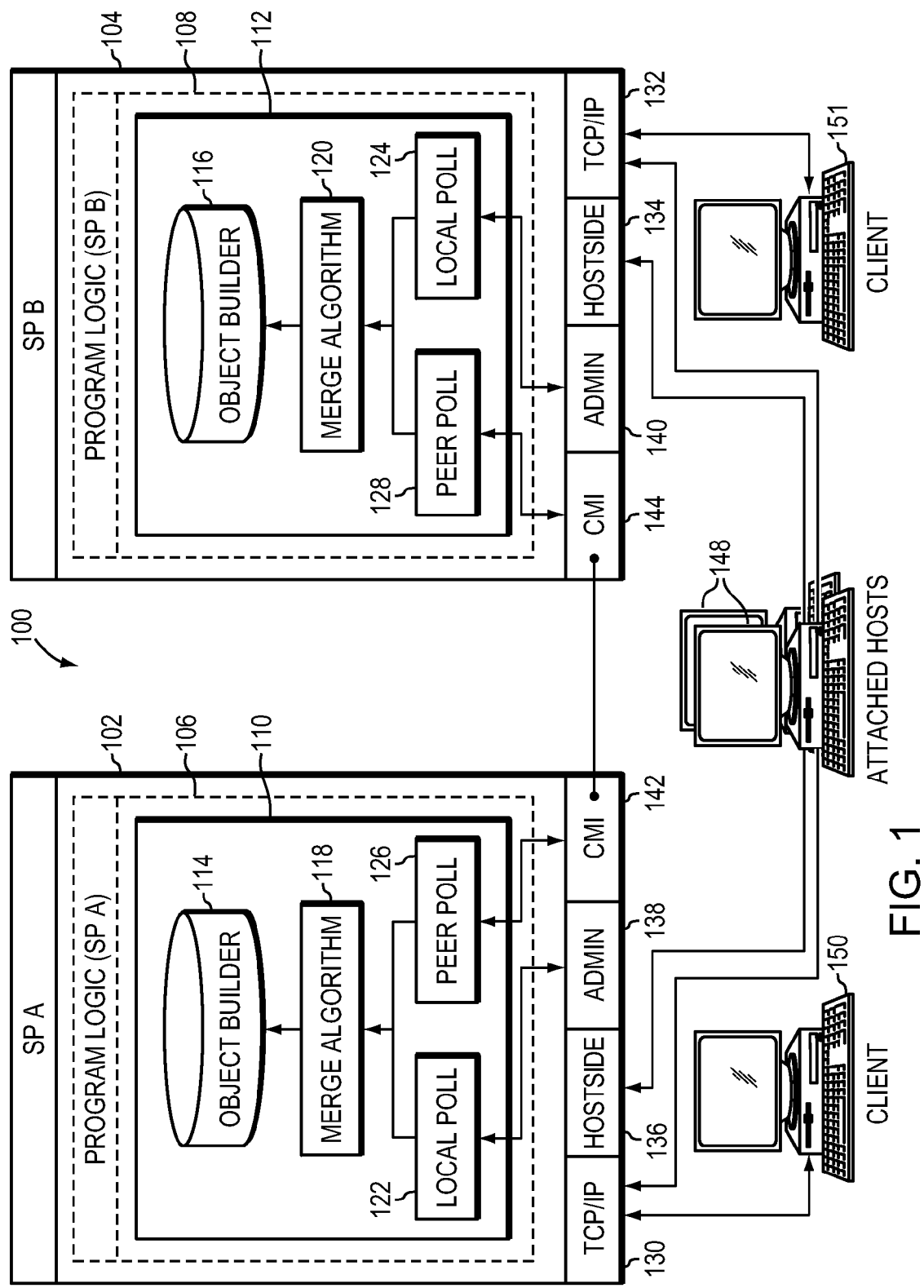
FIG. 1 is a block diagram of a data storage environment with program logic for single point of management in a system including a plurality of storage processors.

The methods and apparatus of the present invention are intended for use in data storage systems, such as the Clariion Disk Array system available from EMC Corporation of Hopkinton, Mass. and in particular are useful for managing a data storage system from a single location, in an environment wherein several computer processors (storage processor or SP) manage components within the storage system.

Overview

The present invention is configured to build a complete state of the array without having to contact a peer SP's agent over the network over which all of the SP's are interconnected. In order for this to happen, a format for responding to a local or peer poll request is implemented. In the preferred embodiment, this allows combining two similar tree structures into one. A so-called merging algorithm is used for this combining a local data construct tree, which is the preferred data format used for communications with the administration layer of the system, and a peer tree. A local tree results from a local SP poll and the peer tree results from a peer specific poll, i.e. a poll of a particular other SP. A peer-specific poll is a poll that returns data that only the peer SP has access to. A so-called sibling merge (FIG. 3) is the starting point of the merging algorithm.

The new single location or point of management allows for combining server and client processes. Instead of multiple processes on each Storage Processor, just one process can be responsible for building the state of the array. A complete state of the array can be built without contacting the server processes over the network. Instead the local SP and peer SP may be contacted at the same level. Contacting the peer SP over an internal channel to the array itself is superior to communicating over the external TCP/IP network. The merging algorithm builds a complete state of the system. Also, since the contacting of the peer is done at a much lower level, much less data is sent and received than with prior art communications of multiple SP's over the network. In addition, only one copy of an object database is needed on each SP instead of two copies of the object database on each SP creating multiple copies of databases, which may or may not be in synch.

To further describe some advantages of known prior art approaches for managing a storage array with multiple processors, a brief description of such management within the preferred Clariion, but in a prior art configuration is now described. However, one skilled in the art will recognize that the invention is applicable to any data storage system having multiple processors, not just the preferred Clariion, and the invention should only be limited by the claims appended hereto. The prior art Clariion used a single device agent on the SP meaning that the object database modeled on each SP reflects only the information available from that SP. SP-specific information from the peer SP is not available in that prior art configuration. In that prior art design this object database is refreshed or "polled" periodically to get the current state of the system. But each object database on each SP only reflects information available from that SP. So a client process that resides as part of the SP would have to periodically contact each instance of the object database over the network to consolidate the database to get a complete view of the array. This requires a lot of code monitoring and maintenance and results in a dependency on the Ethernet, which is not readily apparent to most users. It also means there is more than one copy of the object database, i.e. one in each SP.

Details of the Preferred Embodiment

Referring now to FIG. 1, data storage system architecture 100 includes storage processor A (SP A) 102 and storage processor B (SP B) 104 and known data storage devices in communication with the processors. Together SP A and SPB comprise at least a portion of a data storage system. The processors combined with other components, such as well known computer storage disks (not shown) form a storage array, such as in the preferred EMC Clariion storage array. This invention is directed at resolving communication difficulties between such different storage processors, but one skilled in the art will recognize it is applicable to resolving such difficulties between different elements in a data storage environment. Therefore the invention is not limited by the particular example of a preferred embodiment but only by the claims appended hereto.

Figure 13:
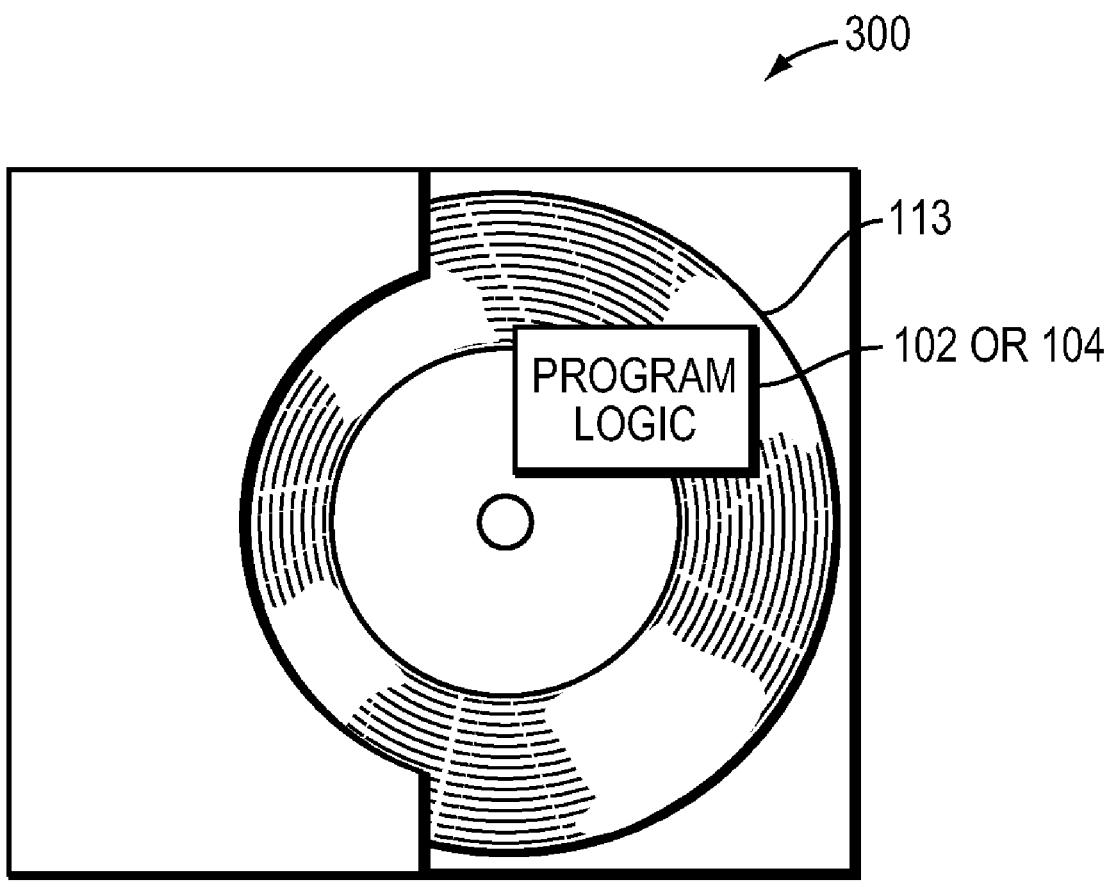
FIG. 13 is a computer program product including a computer-readable medium encoded with program logic capable of executing the methodology described herein.

Reference is made now to FIG. 1 and also to FIG. 13. SP A and SP B each include Program Logic 106 and 108, respectively. The Logic in a preferred embodiment is program code also referred to as software. The Program Logic carries out methodology described herein and may be embodied on a computer-readable medium such as medium 113 on FIG. 13 so that the Logic 102 or 104 encoded on the medium forms a computer program product 300.

The Logic may also be loaded into conventional computer memory and executed by a conventional CPU. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. Such may be implemented such that herein, when the program code is received and loaded into and executed by a machine, such as a computer, the machine becomes an apparatus for practicing the invention. When executed in a computer's memory by a processing unit, the logic reconfigures a general purpose digital computer into a special purpose digital computer enabled for carrying out the process and methodology discussed herein. When implemented on a general-purpose processor, the program code combines with the processor of the computer to provide a unique apparatus that operates analogously to specific logic circuits.

Referring again to FIG. 1, Program Logic 106 and 108, each include respective similar components in code modules 110 and 112, respectively. In a preferred embodiment, Program Logic is part of the Navisphere storage management software available with EMC's Clariion data storage system. Modules 110 and 112 include, respectively, code elements designated with names indicating at least some of their functionality. These elements include Object Builder 114 and 116, Merge Algorithm 118 and 120, Local Poll 122 and 124, and Peer Poll 126 and 128.

In a typical data storage environment, hosts 148 and clients 150 and 151 interact with the data storage system. The Storage Processors 102 and 104 also communicate with the attached hosts through hostside modules 136 and 134, respectively, and with clients through TCP/IP modules 130 and 132, respectively. TCP/IP is the well-known Transmission Control Protocol/Internet Protocol which is a basic communication language or protocol of the internet. The invention allows communications to occur at a local level between SP's without having to go through the network and which provides advantages of reduced overhead and increased speed.

Peer Poll 126 and 128 communicate with CMI 142 and 144, respectively, and through the respective CMI, each peer SP communicates with each other peer SP. The CMI is a SCSI-based channel connection between the two Storage Processors and is used for Peer management communication. Local Poll 122 and 124 communicate with Admin module 138 and 140, respectively. The Admin is a layer module that communicates with the preferred Navisphere for managing layered drivers with the Clariion architecture.

An objective of the architecture 100 is to allow a so-called single point of management so that it is not necessary to have agents responsible for carrying out many of the functions carried out by the Program Logic of the preferred embodiment. Removal of such agent's and their attendant processes and associated overhead frees up resources including memory and processing cycles on the data storage system or storage array.

As this diagram depicts, the CMI channel (connection) is a bidirectional medium over which the SP's can communicate. This medium is used to receive Peer poll data during a poll. The Object Builder is responsible for building the state of the array. To accomplish this, it executes a poll periodically. When it is recognized by the Program Logic that polling the system is being conducted, the Peer polling and merging algorithm intervenes. The Local poll is allowed to complete by contacting Admin with a request to get a state of the Local SP. The Peer SP is also contacted over the CMI with a request to get all Peer specific data about the state of the Peer SP. This Peer specific data is received over CMI and the results are merged from the Local and Peer Polls using the Merging algorithm.

Figure 2:
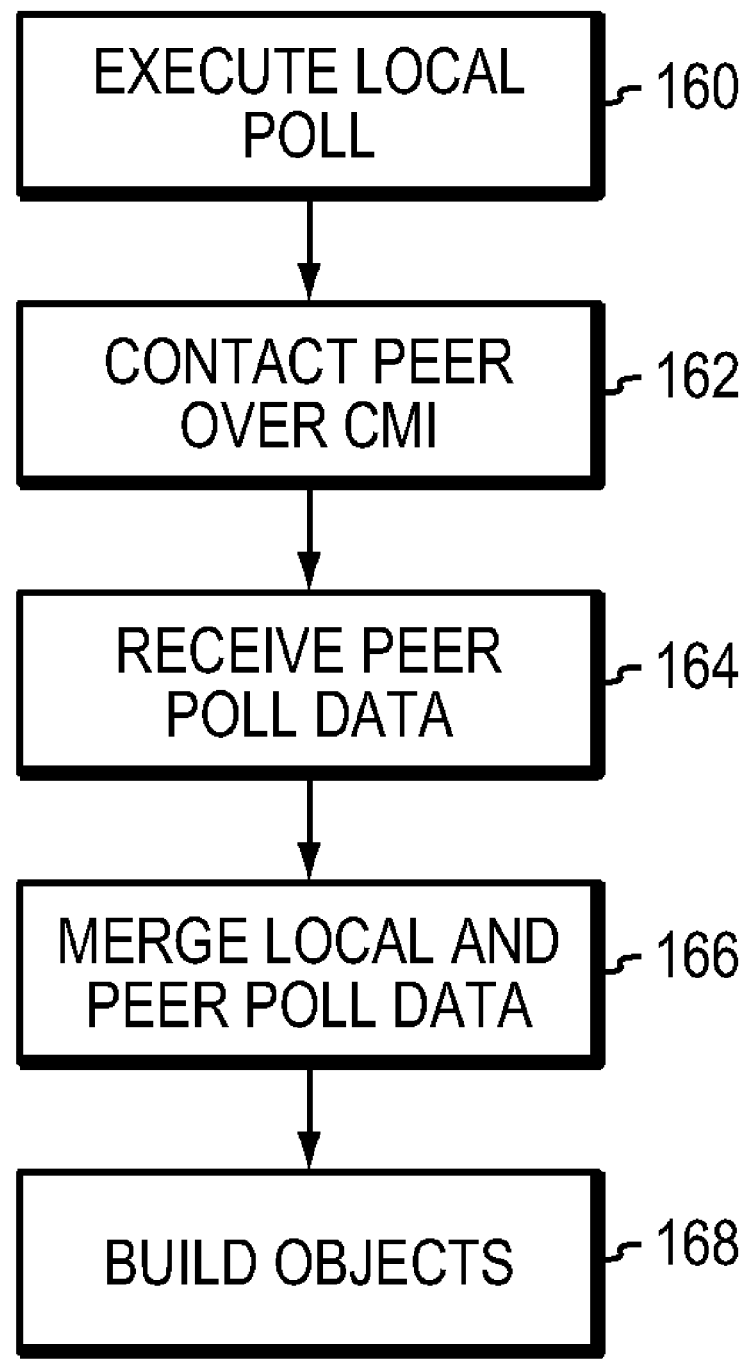
FIG. 2 is a flow logic diagram showing an overview of a methodology carried out by the program logic of FIG. 1 in the environment also shown in FIG. 1.

Referring to FIG. 2, a general flow diagram of a preferred method of enabling single point management of a storage array is shown. The general method begins with execution of a poll operation. Step 160 is execution of the Local Poll. Step 162 involves contacting the Peer of an SP over the CMI channel to get the Peer specific poll data. Step 164 involves receiving a response from the Peer in the form of the Peer specific poll data. Step 166 involves merging the resulting Peer specific poll data with the result of the Local poll. And Step 168 includes building specific storage objects needed for the storage management based on the poll results and merging.

FIGS. 3-8 show a high level description of the preferred merging algorithm for the single point of management in the storage environment. The preferred embodiment includes a merge algorithm that deals with merging two similar data constructs (e.g., Step 166, FIG. 2). Each data construct can be embedded within another data construct, have embedded data constructs within it, be a Peer of another data construct, or have peer data constructs. In addition, each data construct can store data and does store a tag describing the type of data construct. Given this description, the data construct generally results in a tree structure. This algorithm involves merging two trees with similar root data constructs and different children constructs.

A data construct is then created based on data retrieved on the Local machine. Then, in the preferred embodiment, a data construct from another machine (e.g., Peer SP) is communicated over the CMI channel 142-144 (FIG. 1). This Peer data construct tree has similar root data constructs as the Local data construct tree, but it only has Peer specific data constructs within it. These two trees are merged together. Starting at the top level on both the Local and Peer data constructs an attempt is made to find the matching data construct by its tag. This is done by getting the tag for the current Local data construct and attempting to match it with the tag of the current Peer data construct or any of its Peers.

Referring to FIG. 3, an overview of peer or sibling merge is shown. Nodes at the same level in the local and peer trees are considered, starting at the root level. In Step 222, Sibling Merge begins the overall process that will include steps from FIGS. 4-8. In Step 224, for any nodes that exist only on the Local data construct but not on the Peer, i.e., Do Nothing. In step 226, Merge Nodes steps are carried out for any nodes that exist both on the Local and the Peer (more detail on the Merge Nodes steps are given in FIG. 4). In step 228, Append Peers steps are carried out for any nodes that exist only on the Peer but not on the Local (more detail on the Append Peers steps are given in FIG. 5).

Referring to FIG. 4, in Step 232, the Merge Nodes methodology is described. In the example case shown, for each pair of matching nodes, A is used to represent the node of the local tree and B is used to represent the node of the peer tree. The Merge Nodes steps include Merge Data, shown in more detail in FIG. 7, Merge Embedded steps, shown in more detail in FIG. 8, and Append Embedded steps, shown in more detail in FIG. 6. Steps 234, 238, 242, and 246 are all truth determining steps, wherein if the result of the "if" clause is true certain results occur and if false other results occur. In Step 234, if neither A nor B have embedded nodes (TRUE), then the Merge Data process of Step 236 occurs, but if that is FALSE the processing flows to Step 238. In Step 238, if only A has embedded nodes (TRUE), then Do Nothing is represented by in fact doing nothing in Step 240, but if that is FALSE then processing flows to Step 242. In Step 242, if only B has embedded nodes (TRUE), then Append Embedded steps are performed in Step 244, but if that is FALSE then processing flows to Step 246. In Step 246, if both A and B have embedded nodes (TRUE), then Merge Embedded steps are performed in Step 248, but if that is FALSE then processing flows to Step 250 and returns.

FIGS. 5-8, show the Append Peers steps (FIG. 5), Append Embedded steps (FIG. 6), Merge Data steps (FIG. 7) and Merge Embedded steps (FIG. 8). In Step 252 (FIG. 5), Append Peers steps begin and return at Step 258, and include in-between Step 256, involving appending the extra Peer nodes to the Local nodes, implicitly including their embedded nodes. In FIG. 6, Append Embedded steps begin at Step 260, and return at Step 264, and include Step 262 positioned in-between. Step 262 involves embedding the Peer's (B's) embedded nodes under the Local node (A). In FIG. 7, Merge Data steps begin at Step 266, and return at Step 270, and include Step 268 positioned in-between.

Step 268 involves overwriting A's data with B's data. In FIG. 8, Merge Embedded steps begin at Step 272, and return at Step 278, and include Steps 274 and 276 positioned in-between. Step 274 involves moving down to the embedded level on the Local and Peer trees, and Step 276 is the Sibling Merge detailed in FIG. 3, which involves recursive steps incorporating steps in the related FIGS. 4-8 and then returning to FIG. 3 and repeating the cycle until all the recursive steps are completed.

Figure 9:
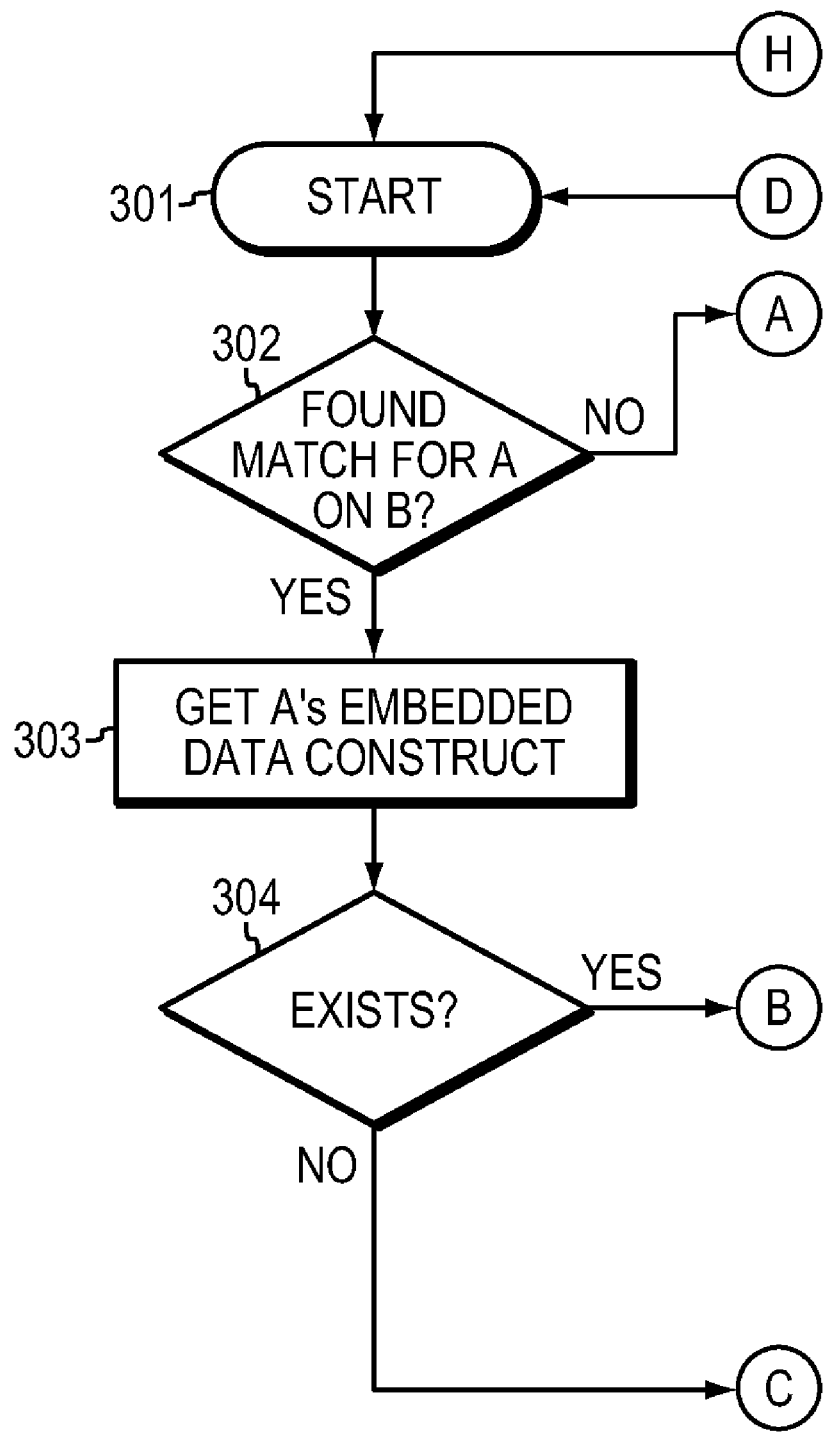
FIG. 9 is a flow logic diagram showing more detail of the methodology of FIG. 2 and using the aspects shown in FIGS. 3-8.
Figure 10:
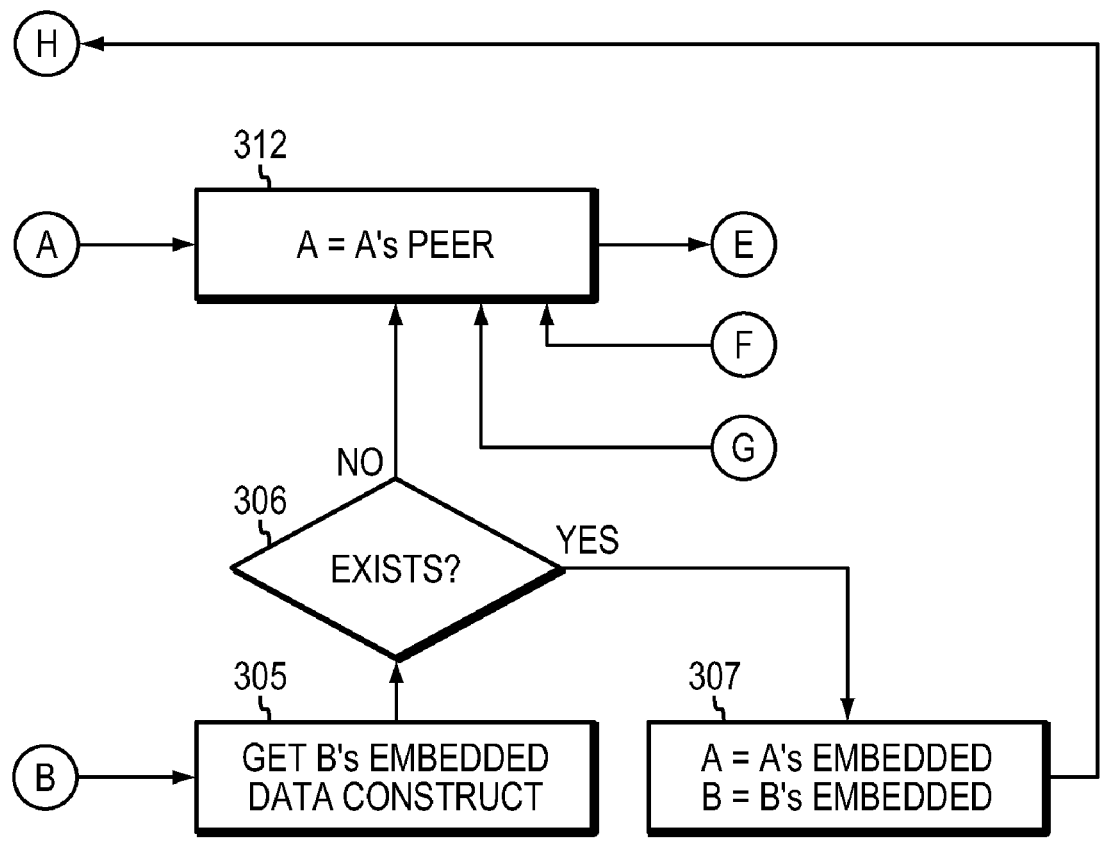
FIG. 10 is another flow logic diagram showing more detail of the methodology of FIG. 2 and using the aspects shown in FIGS. 3-8.

Referring to FIGS. 9-12, the general method involving the merge and other steps described with reference to FIGS. 3-8 is described. This process is started in Step 301 (FIG. 9), and regarding terminology, data construct A is the Local data construct and data construct B is the Peer data construct. In Step 302, an inquiry is posed along with an attempt to match data construct A with data construct B or any of data construct B's Peer data constructs. If there is a match processing flows to Step 303, but if there is no match then processing goes through connection point A to Step 312 (FIG. 10).

If both data constructs don't have an embedded data construct then it is assumed that the data received from the Peer (data construct B) is correct and data construct A's data is changed to that of data construct B. This leads to processing including the Steps 303-304 (FIG. 9), 308-310 (FIG. 11A), and 312 (FIG. 10).

Figure 11A:
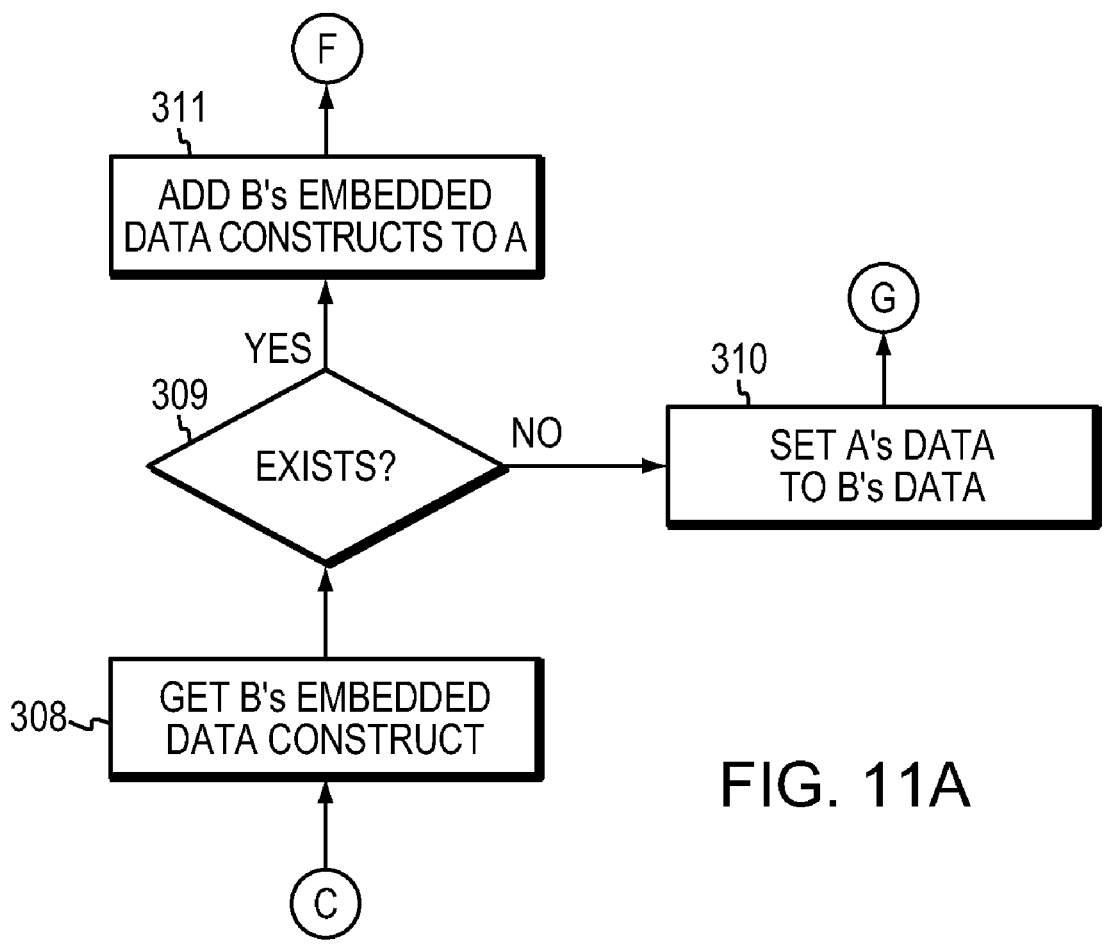
FIG. 11A is another flow logic diagram showing more detail of the methodology of FIG. 2 and using the aspects shown in FIGS. 3-8.
Figure 11B:
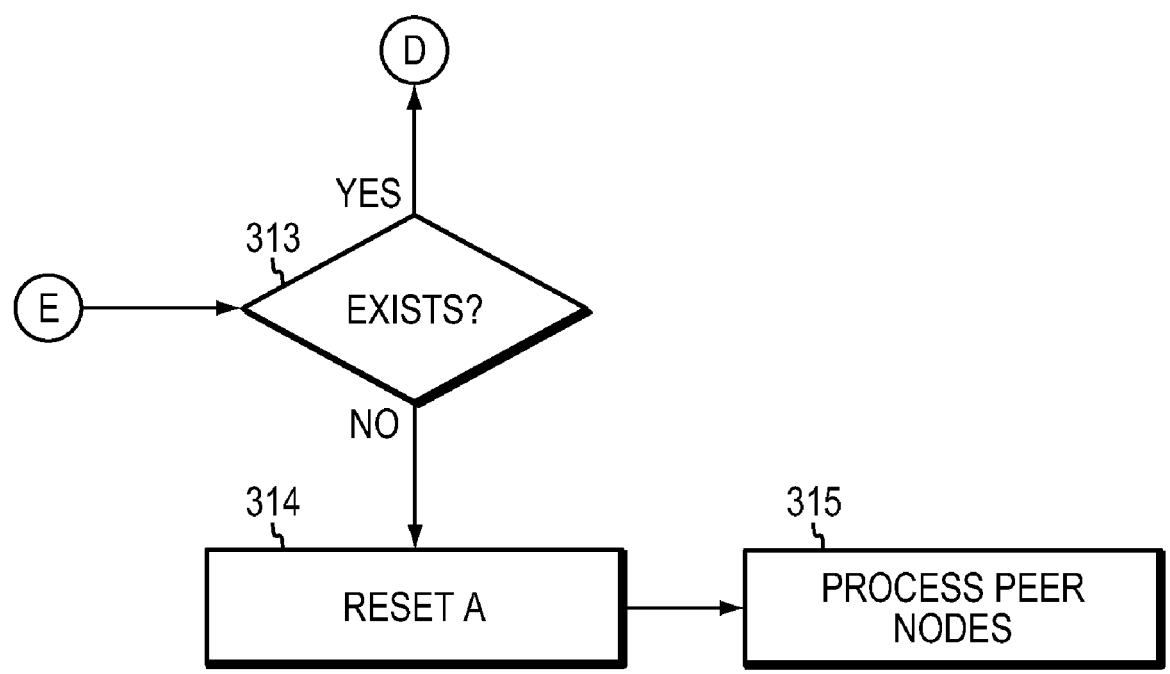
FIG. 11B is another flow logic diagram showing more detail of the methodology of FIG. 2 and using the aspects shown in FIGS. 3-8.
Figure 12:
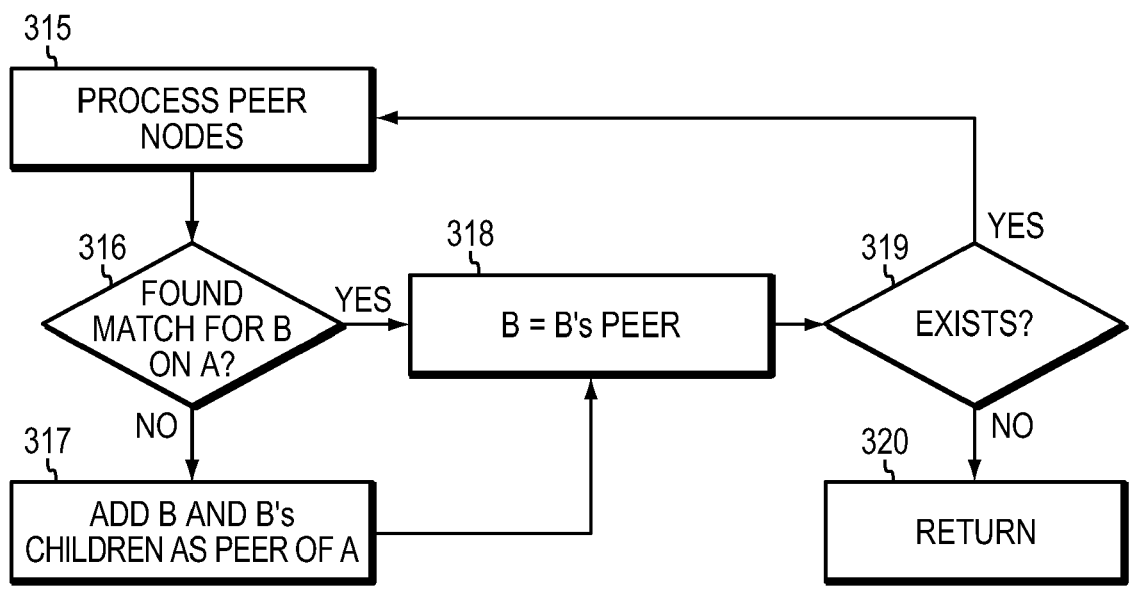
FIG. 12 is another flow logic diagram showing more detail of the methodology of FIG. 2 and using the aspects shown in FIGS. 3-8.

A general overview of the Method Steps in FIGS. 9-12 is now given, wherein roman numerals I-XV are used to depict overall combination Steps containing the Steps shown in the FIGS. 9-12, and processing occurs, at least in part in a recursive fashion. The overall combinations are now described:

I. the Logic attempts to match data construct A with data construct B or any of data construct B's Peer data constructs: (Method Steps 301, 302; FIG. 9);
  1) If there is a match go to Overview Step II: (Method Steps 302, 303; FIG. 9); and
  2) If there is NOT a match then we go to Overview Step VI: (Method Steps 302, 312; FIGS. 9-10);
II. if both data constructs don't have an embedded data construct then assume the data received from the Peer (data construct B) is correct and we set data construct A's data to that of data construct B, then go to Overview Step VI: (Method Steps 303, 304, 308, 309, 310, 312; FIGS. 9-11A);
III. if data construct A doesn't have an embedded data construct and data construct B does, then embed all of data construct B's embedded data constructs below data construct A, go to Overview Step VI: (Method Steps 303, 304, 308, 309, 311, and 312; FIGS. 9-11A);
IV. if data construct A does have an embedded data construct and data construct B does not, then do nothing, go to Overview Step VI: (Method Steps 303, 304, 305, 306, and 312; FIGS. 9-10);
V. if both data construct A and data construct B have embedded data constructs then set A to A's embedded data construct and B to B's embedded data construct and recursively go to Overview Step I: (Method Steps 303, 304, 305, 306, 307, 301; FIGS. 9-10);
VI. the Logic sets data construct A to data construct A's Peer data construct: (Method Step 312; FIG. 10);
VII. if the new data construct A is NOT NULL then run this algorithm against the new data construct A and data construct B: (Method Steps 313, 301; FIGS. 9 and 11B);
VIII. if data construct A is now NULL then reset data construct A to the first data construct at this level of the tree: (Method Steps 313, 314; FIG. 11B);
IX. Attempt to match B with A or any of its Peers: (Method Steps 315, 316; FIG. 12);
X. if a match is found then the Logic sets B to B's Peer: (Method Steps 316, 318; FIG. 12):
  1) if B exists then go to Overview Step IX: Method Steps 318, 319, 315;
  2) if B does not exist then return: Method Steps 318, 319, 320;
XI. if a match is not found then add data construct B and all of its embedded data constructs as a Peer of data construct A, then set B to B's Peer: (Method Steps 315, 316, 317, 318; FIG. 12);
  1) if B exists then go to Overview Step IX: Method Steps 318, 319, 315; and
  2) if B does not exist then return: Method Steps 318, 319, 320.

Generally such operation performed by the Logic described includes a recursive algorithm. In the places where it is designated in the Method Steps of FIGS. 9-12 that the Logic recursively does something, once that something is accomplished the flow of Steps returns to a higher level to finish processing the data construct trees. For instance, in overall combination Step V above, A is set A to A's embedded and B to B's embedded and recursively processing goes back to Step I, and steps are repeated until all steps are completed. What is going on at a more basic level is that the Logic is calling the Merge function with A's embedded and B's embedded. When everything below A and B is finished processing (starting with A's embedded and B's embedded), then there is a return and continued processing of A and B's peers.

A system and method has been described for managing two or more storage processors in a data storage environment from a single point of management. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage system having a plurality of processors each managing an object database associated with each processor, and each processor being connected to each other processor, a method for managing a state of the data storage system by contacting one single processor of the plurality of processors, the method comprising:
  (i) contacting a single processor of the plurality of processors with a request for the single processor to determine a state of the data storage system; and
  (ii) in response to the contacting step (i), the single processor contacting each other peer processor in the data storage system and merging selected data from the single processor with data from the peer processor to determine the state of the data storage system.

2. The method of claim 1, wherein the single processor conducts a local poll to determine a local state of the data storage system before step (ii).

3. The method of claim 2, wherein the single processor receives a peer poll from each peer processor contacted in step (ii).

4. The method of claim 3, wherein the local and peer poll is merged to perform the step of merging selected data in step (ii).

5. The method of claim 4, wherein objects are built in an object database associated with the single processor that may be used to determine the state of the data storage system in step (ii).

6. The method of claim 1, wherein the selected data from step (ii) is constructed as a tree.

7. The method of claim 6, wherein the single processor conducts a local poll to determine a local state of the data storage system before step (ii).

8. The method of claim 7, wherein the single processor receives a peer poll from each peer processor contacted in step (ii).

9. The method of claim 8, wherein the local and peer poll include the selected data constructed as a tree and that selected data is merged to perform the step of merging selected data in step (ii).

10. The method of claim 9, wherein objects are built in an object database associated with the single processor that may be used to determine the state of the data storage system in step (ii).

11. The method of claim 1 wherein the merging further comprises overwriting local poll data with peer poll data.

12. The method of claim 1 wherein the appending includes appending embedded nodes from the peer poll.

13. A data storage system comprising:
- a plurality of processors and an object database associated with each processor, and each processor is connected to each other processor,
- a processor of the plurality of processors configured for executing computer-executable steps for managing a state of the data storage system when contacted with a request to determine the state of the data storage system, the steps comprising:
    - (i) receiving the request to determine the state of the data storage system; and
    - (ii) in response to the receiving step (i), the single processor contacting each other peer processor in the data storage system and merging selected data from the single processor with data from the peer processor to determine the state of the data storage system.

14. The system of claim 13, wherein the single processor conducts a local poll to determine a local state of the data storage system before step (ii).

15. The system of claim 14, wherein the single processor receives a peer poll from each peer processor contacted in step (ii).

16. The system of claim 15, wherein the local and peer poll is merged to perform the step of merging selected data in step (ii).

17. The system of claim 16, wherein objects are built in an object database associated with the single processor that may be used to determine the state of the data storage system in step (ii).

18. The system of claim 17, wherein the local poll and the peer poll include selected data constructed as a tree and that selected data is merged to perform the step of merging selected data in step (ii).

19. The system of claim 13, wherein the selected data from step (ii) is constructed as a tree.

20. The system of claim 13 wherein the merging further comprises overwriting local poll data with peer poll data.

21. In a data storage system having a plurality of processors each managing an object database associated with each processor, and each processor being connected to each other processor, a computer program product for managing a state of the data storage system by contacting one single processor of the plurality of processors, the computer program product comprising:
- a non-transitory computer readable medium encoded with program logic configured for carrying out the following computer-executable steps:
    - (i) receiving a request for a single processor of the plurality of processors to determine a state of the data storage system; and
    - (ii) in response to the receiving step (i), the single processor contacting each other peer processor in the data storage system and merging selected data from the single processor with data from the peer processor to determine the state of the data storage system.

22. The program product of claim 21, wherein the single processor conducts a local poll to determine a local state of the data storage system before step (ii).

23. The program product of claim 22, wherein the single processor receives a peer poll from each peer processor contacted in step (ii).

24. The program product of claim 23, wherein the local and peer poll is merged to perform the step of merging selected data in step (ii).

25. The program product of claim 24, wherein objects are built in an object database associated with the single processor that may be used to determine the state of the data storage system in step (ii).

26. The program product of claim 21, wherein the selected data from step (ii) is constructed as a tree.

* * * * *